United States Patent
Kagleder

(10) Patent No.: US 7,406,944 B2
(45) Date of Patent: Aug. 5, 2008

(54) IGNITION CONTROL SYSTEM

(75) Inventor: Erich Kagleder, Piding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/847,799

(22) Filed: Aug. 30, 2007

(65) Prior Publication Data
US 2008/0006242 A1    Jan. 10, 2008

Related U.S. Application Data

(63) Continuation of application No. PCT/EP2006/001377, filed on Feb. 16, 2006.

(30) Foreign Application Priority Data
Mar. 4, 2005    (DE) .................. 10 2005 009 981

(51) Int. Cl.
*F02P 5/15* (2006.01)

(52) U.S. Cl. .................. 123/406.21; 123/406.27

(58) Field of Classification Search ............. 123/406.19, 123/406.2, 406.21, 406.26, 406.27, 406.29, 123/630; 701/101, 102, 111; 73/35.07, 35.08, 73/116, 117.3
See application file for complete search history.

(56) References Cited

U.S. PATENT DOCUMENTS

| | | | | |
|---|---|---|---|---|
| 5,694,900 A | * | 12/1997 | Morita et al. ........... | 123/406.21 |
| 5,895,839 A | * | 4/1999 | Takahashi et al. ....... | 123/406.26 |
| 6,049,176 A | * | 4/2000 | Aoki et al. .............. | 315/209 M |
| 6,216,530 B1 | * | 4/2001 | Shimizu et al. ................ | 73/116 |
| 6,360,587 B1 | | 3/2002 | Noel | |
| 6,477,457 B1 | | 11/2002 | Fendt et al. | |
| 6,766,243 B1 | | 7/2004 | Haussmann et al. | |
| 6,779,517 B2 | * | 8/2004 | Sakakura ..................... | 123/630 |
| 6,880,540 B2 | * | 4/2005 | Fuma et al. ................. | 123/634 |
| 2005/0028786 A1 | * | 2/2005 | Zhu ....................... | 123/406.26 |
| 2008/0046163 A1 | * | 2/2008 | Kagleder .................... | 701/102 |

FOREIGN PATENT DOCUMENTS

| | | |
|---|---|---|
| DE | 198 13 955 A1 | 9/1999 |
| DE | 101 38 976 A1 | 3/2002 |
| EP | 0 294 256 B1 | 12/1988 |
| WO | WO 01/25625 A1 | 4/2001 |

* cited by examiner

*Primary Examiner*—Willis R Wolfe, Jr.
(74) *Attorney, Agent, or Firm*—Crowell & Moring LLP

(57) ABSTRACT

A device for ignition control in a cylinder of an internal combustion engine includes an ignition coil which has a connected primary winding and a secondary winding, which is connected to a spark plug. The device also includes an ignition control unit, which connects the primary winding by way of a first line and is connected to the secondary winding by way of a second line. The second line supplies an ionic current signal emitted from the spark plug to the ignition control unit. A single line is used as the first line and the second line. The active direction of the line can be adjusted by different levels of voltage applied to the line.

10 Claims, 2 Drawing Sheets

IGNITION CONTROL SYSTEM

CROSS-REFERENCE TO RELATED APPLICATIONS

This application is a continuation of PCT International Application No. PCT/EP2006/001377, filed on Feb. 16, 2006, which claims priority under 35 U.S.C. § 119 to German Application No. 10 2005 009 981.5, filed Mar. 4, 2005, the entire disclosures of which are expressly incorporated by reference herein.

BACKGROUND AND SUMMARY OF THE INVENTION

The present invention relates to an ignition control system for the ignition control in a cylinder of an internal-combustion engine, having an ignition coil whose primary winding is switched and having a secondary winding connected with a spark plug. The ignition control unit switches the primary winding by way of a first line and is connected with the secondary winding by way of a second line, the second line feeding an ionic current signal originating from the spark plug to the ignition control unit. A system of this type is known from German Patent document DE 101 38 976 A.

It is thus known to use the spark plug as a sensor for the ionic current, which is caused as a result of the combustion of an air-fuel mixture within the cylinder of the internal-combustion engine. The intensity of the ionic current significantly changes as a function of the combustion condition within the combustion chamber. By utilizing this effect, the combustion condition within the respective cylinder can be identified, and also the occurrence of a misfiring or knocking combustion in the internal-combustion engine can be determined.

If the primary winding and the secondary winding are components of a normal single-coil ignition system, that is, a system consisting of the respective spark plug and a pertaining ignition coil, which system is switched by the ignition control unit, at least four electric connecting contacts are obtained between the ignition control unit and the single-coil ignition system, specifically for the two potentials of the on-board power supply, the control of the primary winding, and the return of the ionic current signal.

In contrast, only three connecting contacts are required in the case of a conventional ignition control having a single-coil ignition system, that is, an ignition control without taking into account the ionic current signal. With respect to an internal-combustion engine having several cylinders, taking the ionic current signals into account leads to a basically different wiring construction. In addition, there are contact problems, which occur with each connecting contact and which rise proportionally with the number of connecting contacts.

It is an object of the invention to provide a system of the above-mentioned type, in which the number of the connecting contacts (and of the contact problems connected therewith) are kept to a minimum.

This object is achieved by the system for the ignition control in a cylinder of an internal-combustion engine, having an ignition coil whose primary winding is switched and having a secondary winding connected with a spark plug. The ignition control unit switches the primary winding by way of a first line and is connected with the secondary winding by way of a second line, the second line feeding an ionic current signal originating from the spark plug to the ignition control unit. A single line is used as the first and the second line. The operating direction of the line can be adjusted by different voltage levels applied to the line.

The invention utilizes a single electric line, which exists between the ignition control unit and the single-coil ignition system, as a current interface, which is operated in two directions. A current interface is always insensitive to ground offsets between the engine block and the ignition control unit. A ground offset is the difference of the reference potential (0V) between two spatially mutually separated electric circuits caused by electromagnetic radiation and/or current flow in connection with the impedance of the ground connection. A current interface normally has a current source (transmitter) and a current drain (receiver). By the establishment of two operating modes by way of the voltage levels, information can be transmitted in two directions successively with respect to time. As a result, only three connecting contacts are required between the ignition control unit and the single-coil ignition system.

The operating mode is differentiated by a voltage level which is clearly above or below 4 V. When the ignition control unit operates as a transmitter, that is, when it controls the primary winding of the ignition coil for the triggering of the ignition spark, it actively pulls the level of the line to the ground (0V) or leaves the line open passive, 4V or 0 mA). A switching circuit logic disposed in front of the ignition coil differs by way of the current occurring on the line with respect to an active or a passive line. A digital signal can thereby be transmitted to the switching circuit logic, by which the ignition is triggered.

Inversely, for transmitting the ionic current to the ignition control unit, the voltage level of the line is adjusted to 8V. Then, in the ignition coil, the switching circuit logic impresses the ionic current on the line. The engine timing gear can determine and process this current by way of a precision resistor. This differentiation of the two line signals between analog and digital additionally facilitates the recognition of the operating direction of the current interface.

If the ionic current is additionally detected in the switching logic, the resistance to interferences will clearly be improved because the ionic current situated in the uA range is already treated close to the spark plug.

For this purpose, it may be advantageous to additionally provide an amplifier circuit in the switching logic for the ionic current signal originating from the secondary winding. As a result, the lowest ionic currents can also be detected.

A further improvement is obtained when the amplifier circuit is controlled in its amplification factor corresponding to the intensity of the ionic current. This control can advantageously be carried out from the ignition control unit. The amplification is the greater, the weaker the ionic current signal is at first.

For this purpose, the amplification factor is defined as a digital signal by the ignition control unit. This signal is therefore digital like the ignition signal and differs from the latter essentially with respect to the point in time at which it is emitted.

If this digital signal is emitted by the ignition control unit at the start within a power cycle for a cylinder, a danger of a collision with the ignition control signal is averted.

The amplification factor itself may be determined by the intensity of the ionic current signal in the preceding power cycle of the cylinder. Since the already amplified ionic current signal arrives at the ignition control unit and the ignition control unit knows the amplification factor used as the basis, it can, in each case, adapt the factor when the amplified ionic current signal changes. In this manner, the ionic current signal arriving in the ignition control unit can be kept in an optimal modulation range with respect to the signal-to-noise ratio without encountering the modulation limits.

Furthermore, the amount of the measuring voltage, as described above for the amplification factor, can also be defined as the digital signal by the ignition control unit.

As a result, when the ionic current signal is sufficiently high, the measuring voltage can be reduced in order to keep the power loss to a minimum when generating the measuring voltage. In addition, with a lower measuring voltage, less energy is also withdrawn from the ignition spark. Since the measuring voltage is added to the secondary high switch-on voltage occurring when the primary winding is switched on, the resulting voltage over the spark plug is unnecessarily increased, whereby the danger of undesired pre-ignitions is reduced.

Other objects, advantages and novel features of the present invention will become apparent from the following detailed description of the invention when considered in conjunction with the accompanying drawings.

DETAILED DESCRIPTION OF THE DRAWINGS

Figure 1:
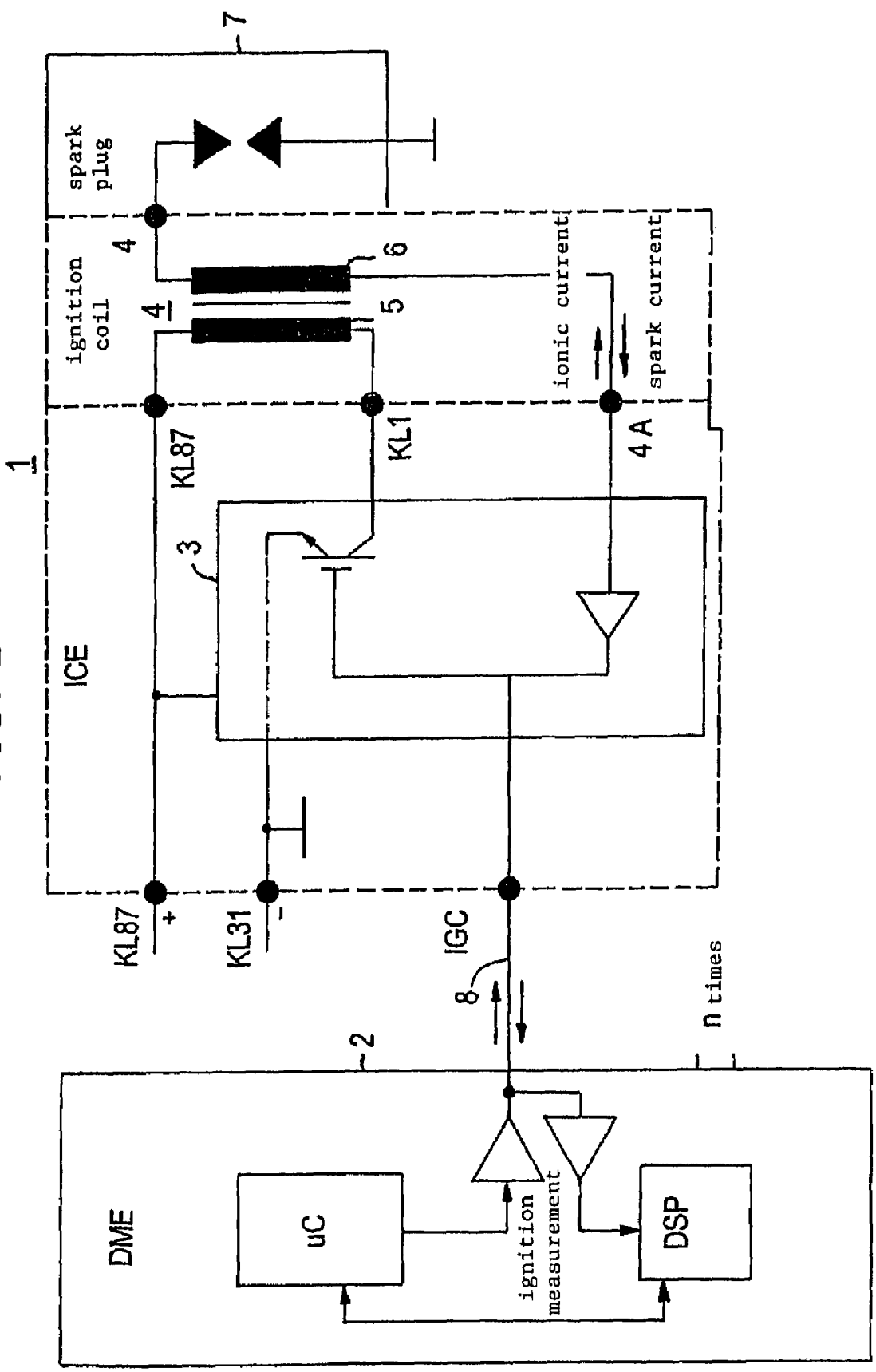
FIG. 1 is a schematic block diagram of an ignition control system for an internal-combustion engine according to the invention.

The ignition control system shown in FIG. 1 illustrates a single-coil ignition system 1 for a cylinder of an internal-combustion engine (not shown), which single-coil ignition system 1 is controlled by an ignition control unit 2. The ignition control unit 2 is contained in a digital engine electronic unit 2 called a DME, which also controls the fuel injection into the different (n) cylinders and, in addition to the one cylinder, the ignition of the other cylinders.

The single-coil ignition system 1 consists essentially of a switching circuit logic 3, an ignition coil 4 having a primary winding 5 and secondary winding 6, and a spark plug 7.

The DME is connected with the single-coil ignition system by way of three lines. There are two lines (KL87 and KL31) to the two poles (+/−) of the on-board power supply, as well as a control line 8 (called IGC).

The control line 8 is used as a current interface between the single-coil ignition system 1 and the ignition control unit 2, which operates in both directions (bidirectionally). The operating direction of line 8 can be adjusted by different voltage levels of 0 and 8V applied to the line.

At the voltage level 8V, the line 8 transmits an ionic current signal originating from the secondary winding 6 as an analog signal. This signal permits the supplying of information concerning the type and extent of the combustion taking place in the cylinder. Caused by the rotational-speed-dependent and load-dependent large extent of the ionic current signal, the latter is amplified in the switching logic 3 and is subsequently transmitted on line 8. The amplification factor provided for this purpose is transmitted as a digital signal also originating from the ignition control unit 2, by way of line 8, to the switching logic. A voltage level of 0V is set for this purpose. At this voltage level, the ignition control unit 2 also transits a digital control signal to the switching logic 3 and thereby triggers the ignition.

Figure 2:
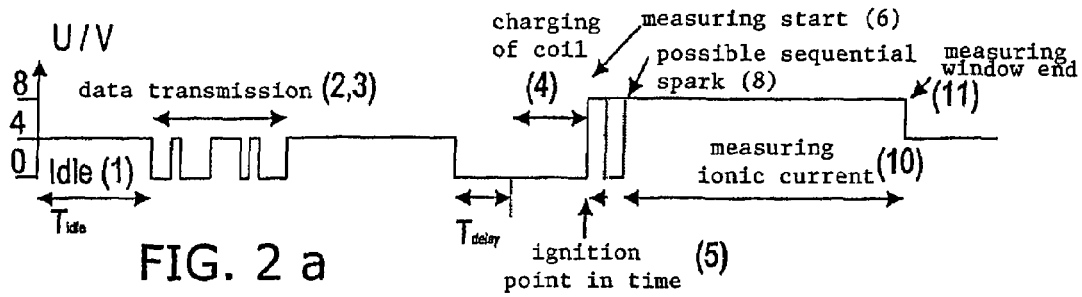
FIG. 2 is a view of several time sequence diagrams for explaining the method of operation of the ignition control system of FIG. 1.
Figure 2:
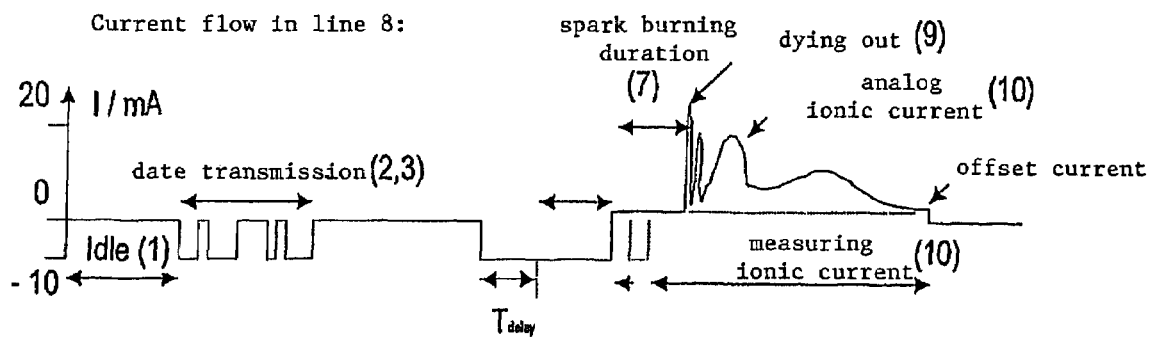
Figure 2:
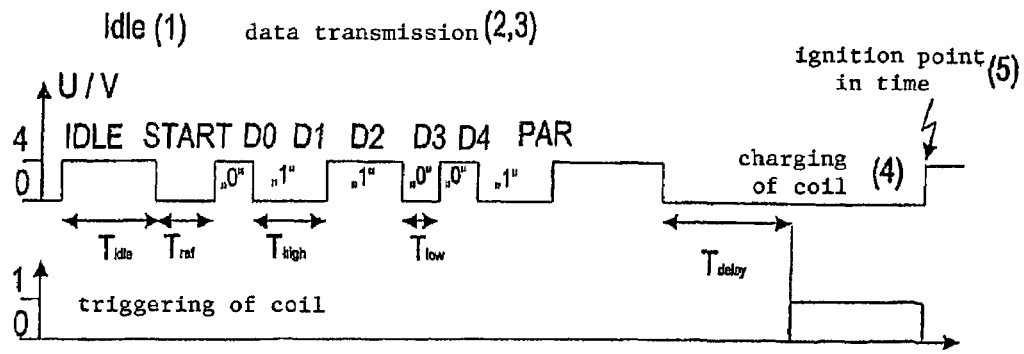

The time sequence is explained in FIG. 2 by way of a voltage curve diagram marked FIG. 2a, a current flow diagram marked FIG. 2b, as well as a data transmission diagram marked FIG. 2c.

Starting from an inoperative condition, during which no signal (4V or 0 mA) is present on signal control line 8 for a sufficiently long idle time $T_{idle}$, the ignition control unit 2, by way of the signal line, activates a start bit called START for the power cycle for a defined time $T_{ref}$ of 150 µs. This time is used as a time reference for the switching circuit logic 3. The start bit is followed by the actual information bits D0-D3. In this case, the differentiation according to $T_{low}$="0" or $T_{high}$="1" is the time duration with respect to the start bit duration $T_{ref}$. Shorter than $T_{ref}$, here, 0.5 times $T_{ref}$ means bit=0; longer than $T_{ref}$, here, 1.5 times $T_{ref}$ means bit=1.

D0, here having the value=1, corresponds to one of two adjustable values for the measuring voltage to be set.

D1-D3 result in one of eight possible binary values for the amplification of the ionic current signal to be adjusted, which signal originates from the secondary winding 6.

With D4 (value=0 or 1), here, at the value=1, an offset current for the ionic current signal is set, and thus a diagnosis of the ignition system is carried out. If the ionic current signal differs in the case of two mutually successive power cycles when, for one of the two power cycles, an offset current shown here is set, the operating sequence is in order. If no difference exists, this points to an error in the switching logic 3. This is based on the consideration that the same operating condition of the internal-combustion engine exists in the case of two mutually successive power cycles.

A parity bit called PAR is used for protecting the data transmission.

The charging of the primary winding 5 then takes place as a function of the desired ignition point-in-time. For this purpose, the signal condition on line 8 is permanently changed. After the expiration of a switch-on delay $T_{delay}$, which is equal to twice the start bit duration $T_{ref}$, the primary winding 5 is charged. This suppresses an unintentional charging of the primary winding 5 during the data transmission. At the ignition point-in-time (marked by a lightening signal), the primary winding 5 is switched off; the secondary high voltage occurs; and the ignition takes place.

After the ignition, 8V is applied to line 8 and the line is thereby switched to ionic current measuring.

After the decaying of the ignition spark current, the residual energy of the ignition coil 4 dies out. This can already be measured in the ionic current signal and can be analyzed for the spark monitoring.

After the residual energy dies out, the adjusted measuring voltage is applied above the spark plug 7 and an ionic current flows. The ionic current is amplified corresponding to the adjusted amplification; as required, it is raised with the adjusted offset current and is returned as analog current by way of line 8 to the ignition control unit 2. By way of the ionic current signal, this ignition control unit 2 detects possible defects in the ignition process and, as required, can take safety measures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An ignition control system for controlling ignition in a cylinder of an internal combustion engine, the system having an ignition coil with a switchable primary winding and a secondary winding, the secondary winding being connected with a spark plug, the system comprising:

an ignition control unit;

a single line by which the ignition control unit switches the primary winding and by which the secondary winding is connected to the ignition control unit, wherein an ionic current signal originating from the spark plug is fed to the ignition control unit via the single line; and wherein an operating direction of the single line is adjustable by different voltage levels applied to the line.

2. The system according to claim 1, wherein a switching circuit logic controlled by the ignition control unit is in a spatial connection with the ignition coil, the ignition control unit transmitting a digital control signal to the switching circuit logic; and wherein the ionic current signal originating from the secondary winding is an analog signal.

3. The system according to claim 2, wherein the switching circuit logic comprises an amplifier circuit for the ionic current signal originating from the secondary winding.

4. The system according to claim 3, wherein an amplification factor of the amplifier circuit is controlled by the ignition control unit.

5. The system according to claim 4, wherein the amplification factor is definable as a digital signal by the ignition control unit.

6. The system according to claim 1, wherein the different voltage levels have values of 0 and 8V.

7. The system according to claim 6, wherein a switching circuit logic controlled by the ignition control unit is in a spatial connection with the ignition coil, the ignition control unit transmitting a digital control signal to the switching circuit logic; and wherein the ionic current signal originating from the secondary winding is an analog signal.

8. The system according to claim 7, wherein the switching circuit logic comprises an amplifier circuit for the ionic current signal originating from the secondary winding.

9. The system according to claim 8, wherein an amplification factor of the amplifier circuit is controlled by the ignition control unit.

10. The system according to claim 9, wherein the amplification factor is definable as a digital signal by the ignition control unit.

* * * * *